3,676,300
Patented July 11, 1972

3,676,300
METHOD FOR PRODUCING MONOACYL DERIVATIVES OF ANTIBIOTIC T-2636C

Hiroichi Yamamoto, Kobe, Takashi Suzuki, Amakasaki, Eiji Higashide, Takarazuka, Takeshi Fugono, Kawanishi, and Komei Mizuno, Osaka, Japan, assignors to Takeda Chemical Industries, Ltd., Osaka, Japan
No Drawing, Filed Mar. 31, 1970, Ser. No. 24,384
Claims priority, application Japan, Mar. 31, 1969, 44/25,096
Int. Cl. C12d 9/00
U.S. Cl. 195—29         8 Claims

ABSTRACT OF THE DISCLOSURE 14-monoacyl derivatives of Antibiotic T-2636C are produced by reacting T-2636C with an organic acid ester in the presence of a culture of a microorganism of the genus Streptomyces, Aspergillus, or Trametes or in the presence of processed matter derived from said cultures.

---

This invention relates to a method for producing pharmaceutically useful acyl derivatives of antibiotic T-2636C.

It has been known that a new antibiotic called "Antibiotic T-2636C" is produced in a cultured broth of a new strain of genus Streptomyces, Streptomyces rochei var. volubilis and can be recovered in a good yield from the cultured broth (cf. Belgian Pat. 715,356).

The antibiotic T-2636C (hereinafter often referred to briefly as "C") is a colorless, crystalline fat-soluble substance which is active against gram-positive bacteria and has two hydroxy groups at positions 8 and 14 as shown in the following formula

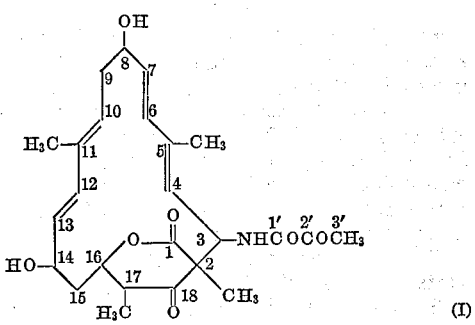

In an attempt to produce new useful derivatives of C by an industrially feasible process, the present inventors have further studied and obtained the folowing results:

(1) C is to be acylated in the presence of a culture of certain microorganisms or a processed matter of the culture,
(2) the acylation occurs specifically at position 14, thus, the reaction yield is very high, and
(3) the resulting T-2636C-14 monoacyl derivative can be recovered in a desired purity by chromatography or other per se conventional means.

This invention is the culmination of the above findings and relates to a method for producing a T-2636C-14-monoacyl derivative (hereinafter often referred to simply as "C-14-acyl derivative"), which comprises reacting T-2636C with an organic acid ester having an acyl group of the formula,

R·CO— wherein R is hydrogen or lower alkyl, in the presence of a culture of a microorganism belonging to the genus Streptomyces, the genus Aspergilus or the genus Trametes, or a processed matter derived from said culture; and recovering the resulting T-2636C-14- monoacyl derivative.

The said organic acid esters include, for example, the esters of fatty acids, which have or do not have relatively lower substituents, such as formic acid, acetic acid, propionic acid, etc. with lower alcohols such as methanol, ethanol, propanol, ethylene glycol, glycerol, etc. More specifically, methyl formate, ethyl acetate, ethyl propionate, monoacetin, triacetin, etc. may be mentioned. In the reaction there is obtained C—14–monoacyl derivative corresponding to the organic acid ester employed.

In the present invention, the use is made of a culture of the above mentioned microorganisms or a processed matter derived from said culture. The term "processed matter" as used herein means any fraction having a higher capacity of acylating C at position 14 than the said culture, which fraction can be obtained by purifying the culture by solvent extraction, or with the aid of an adsorbent material or an ion exchange resin, for instance.

Typical of said microorganisms are Streptomyces rochei var. volubilis (ATCC 21250) Streptomyces tolypophorus (ATCC 21177), Streptomyces hygroscopicus (ATCC 21421), Aspergillus sojae (ATCC 20245), Trametes sanguinea (ATCC 14622) and the like. ATCC numbers in the parenthesis indicate the accession numbers at the American Type Culture Collection in Rockville, Md., U.S.A. Of these strains, Streptomyces rochei var. volubilis is the most desirable for the attainment of the object of the invention, since the culture of the strain itself accumulates a large amount of C and, accordingly, make it possible to obtain the desired C–14-monoacyl derivatives by merely contacting the culture with a suitable organic acid ester.

The processed matter, for example, includes the crude enzymes obtained from the culture of Streptomyces rochei var. volubilis, Streptomyces tolypophorus, Streptomyces hygroscopicus, the crude esterase system obtained from a culutre of Aspergillus sojae. (Journal of Fermentation Techonolgy, vol. 40, P610, 1962) and the crude cellulase system obtained from a culture of Trametes sanguinea (Japanese patent publication No. 217 45/66). The respective crude enzymes have been used for different purposes depending on their own characteristics and it is a new discovery, attributable to our research, that those enzymes can apply to the method of the present application.

A higher conversion to the desired product is attained as the amount of the ester is increased and as the reaction time is extended. The reaction time varies with the reaction conditions and more than 30 minutes is usually needed for the reaction. In case an organic acid ester immiscible with water is employed, it is good practice to blend the reaction system under stirring until an emulsion is formed. The reaction temperature and pH should vary with different types of cultures or enzymes, and it is usually preferable to conduct the reaction at the temperature of 20° to 40° C. and at a pH between 4 and 9.

As a solvent for the extraction of the resulting C-14-monoacyl derivative use is made of the remaining organic acid ester in the cultured broth as well as of a newly added organic solvent other than said organic acid ester, such as, for example, methyl isobutyl ketone, benzene, chloroform, etc. The organic solvent phase is washed with an aqueous solution of a weakly alkaline salt, such as sodium hydrogen carbonate, and, then, with water, for instance, followed by drying over anhydrous sodium sulfate and concentration under reduced pressure The resulting concentrate contains a C-14-monoacyl derivative and the unreacted portion of C. To isolate the desired product from the concentrate, a chromatographic column packed with such an adsorbent as silica gel (chromatographic grade, #0.05–0.2, Merck) can be employed. The above concentration is first diluted with a suitable amount of a low-polarity solvent such as benzene or chloroform and chromatographed. The adsorbed product on the column is then separated by elution with a suitable organic solvent system, such as a mixture of benzene and ethyl acetate. The resulting fraction containing the objective compound is concentrated under reduced pressure. The derivative separates out as crystals without any further treatment or being left standing of the concentrate after the addition of a suitable amount of ether or petroleum ether, for instance.

The physical and chemical characteristics of various C–14–acyl derivatives are as follows:

Physical and chemical properties (a) C–14–monoformate

Colorless plate on recrystallization from ethyl acetate-diethyl ether, M.P. 175° to 177° C. $[\alpha]_D^{22} = -276.0°$ (c.=1.0 in ethanol).

Elementary analysis.—Calculated for $C_{26}H_{33}NO_8$ (percent): C, 64.04; H, 6.82; N, 2.87. Found (percent): C, 63.90; H, 6.72; N, 3.06.

Ultraviolet absorption spectrum $\lambda_{max.}^{EtOH}$ 227 ($E_{1cm.}^{1\%}$ = 1010);

(b) C–14–monoacetate

Colorless plates on recrystallization from ethyl acetate, M.P. 200° to 202° C.; $[\alpha]_D^{22} = -235°$ (c.=1.0 in ethanol).

Elementary analysis.—Calculated for $C_{27}H_{35}NO_8$ (percent): C, 64.67; H, 6.99; N, 2.79. Found (percent): C, 64.59; H, 7.05; N, 2.99.

(c) C–14–monopropionate

Colorless plates on recrystallization from ethyl acetate-diethyl ether, M.P. 198° to 199° C. $[\alpha]_D^{22} = -254.3°$ (c.=1.0 in chloroform).

Elementary analysis.—Calculated for $C_{28}H_{37}NO_8$ (percent): C, 65.23; H, 7.23; N, 2.72. Found (percent): C, 65.17; H, 7.24; N, 2.94.

C–14–monoacyl derivatives are lower in toxicity to mammals and more effective in comparison with the starting C as shown as, for example, in the following test:

| Compound | Acute toxicity [1] ($LD_{50}$), mg./kg. body weight | Effective dose ($ED_{50}$), mg./kg. body weight |
| --- | --- | --- |
| C | 4,100 | 50 |
| C–14–monoformate | 5,000–10,000 | 40 |
| C–14–monoacetate | 8,000–10,000 | 32.5 |
| C–14–monopropionate | >10,000 | 38.5 |

[1] An emulsion of the test compound in 5% gum arabic was administered intraperitoneally to groups of 4 weeks old male mice (ICR-JCL/T grade) and the Median Lethal Dose ($LD_{50}$) was calculated after 7 days.

[2] 4-weeks old male mice were previously infected intraperitoneally with Staphylococcus aureus 308A-1 and directly thereafter an emulsion of the test compound in 0.2% carboxy methyl cellulose was administered per os, and the Median Effective Dose $ED_{50}$ was observed.

The following is a reference example for the production of the starting C and the working examples for the production of C–14–monoacyl derivatives. In these examples, part(s) by weight bears the same relation to part(s) by volume as do gram(s) to milliliter(s).

Reference example.—1.5 part by volume of a medium composed of 1% soluble starch, 2% corn steep liquor, 0.3% peptone and 1% precipitated calicum carbonate is put in a fermenter, the capacity of which is 3 parts by volume, which is sterilized at a pressure of 1.5 kg./cm.² for 15 minutes. The fermenter is inoculated with a culture of Streptomyces rochei var. volubilis T–2636 (ATCC 2150 from agar slants and incubated at 28° C. for 42 hours. The cultured broth is transferred to a sterilized fermenter whose capacity is 200 parts by volume which contains 100 parts by volume of the same medium as the above.

Submerged cultivation is carried out at the temperature of 28° C. and 50% aeration per min. per volume of the medium, with stirring at 200 revolutions per min. 60 parts by volume of the resulting seed culture is transferred to a main fermenter. Thus, 4000 parts by volume of a medium composed of 3% glycerol, 2% corn steep liquor, 1% cotton seed flour, 0.2% peptone and 0.5% sodium chloride (pH 6.8) is put in a fermenter whose capacity being 6000 parts by volume which is then sterilized. The fermenter is inoculated with the above seed-culture and incubated at the temperature of 28° C. and 50% aeration per min. per volume of the medium, with the agitation at 150 revolutions/min. for 44 hours. The accumulation of C in the broth amounts to 200 γ/ml. at the end of the incubation time.

The method according to the present invention will be illustrated by the following examples.

EXAMPLE 1

2000 parts by volume of the broth obtained in reference example is filtered along with 60 parts by weight of a filter-aid, and the cells are further washed with 400 parts by volume of water. The filtrate is combined with the washings, followed by the addition of 1000 parts by volume of ethyl acetate. The mixture is stirred for 30 minutes and, then, allowed to stand for about 2 hours. The organic phase is washed with 200 parts by volume of water and concentrated to 20 parts by volume under reduced pressure. The concentrate is washed twice with 5 parts by volume of 2% aqueous solution of sodium bicarbonate and, then, with 5 parts by volume of water, followed by further concentration until the quantity is 2 parts by volume. The concentrate is diluted with 6 parts by volume of benzene and caused to be adsorbed on a column of 2 parts by weight of silica gel which has been suspended in benzene. Then, a mixture of benzene and ethyl acetate (1:1) is passed through the column, whereupon C–14–monoacetate first emerges from the column, followed by the emergence of C. The monoacetate fraction is concentrated under reduced pressure to obtain pillars of C–14–monoacetate, which yield on recrystallization from ethyl acetate 0.15 part by weight of pure crystals.

EXAMPLE 2

To 3000 parts by volume of the filtrate obtained in reference example, 600 parts by volume of methyl acetate is added, and the mixture is incubated for 4 hours.

It is then allowed to stand and the aqueous phase is extracted with 1000 parts by volume of methyl isobutyl ketone. The organic phases are combined, washed twice with 400 parts by volume of 2% aqueous sodium bicarbonate solution and then with water, followed by concentration under reduced pressure.

To 5 parts by volume of the concentrate is added 20 parts by volume of chloroform, and the mixture is treated with 20 parts by weight of silica gel in the same manner as Example 1. The effective fraction is concentrated to obtain 0.05 part by weight of C–14–monoacetate.

EXAMPLE 3

In the procedure of Example 2, propyl acetate is used in place of methyl acetate to obtain 0.15 part by weight of C–14–monoacetate.

EXAMPLE 4

In the procedure of Example 2, ethyl formate is used in place of methyl acetate, and ethyl acetate-diethylether is used as a crystallization solvent to obtain 0.23 part by weight of C–14–monoformate.

EXAMPLE 5

In the procedure of Example 4, ethyl propionate is used in place of ethyl formate to obtain 0.23 part by weight of C–14–monopropionate.

EXAMPLE 6

*Streptomyces tolypophorus* (ATCC 21177) is used to inoculate a medium (pH 7.0) composed of 2.0% glucose, 3.0% soluble starch, 1.0% corn steep liquor, 1.0% raw soybean flour, 0.5% peptone, 0.3% sodium chloride and 0.5% precipitated calcium carbonate.

Incubation is carried out at 28° C. for 42 hours and the resulting broth is filtered along with 3% filter-aid. To 1,000 parts by volume of the filtrate, after removing tolypomycin (an antibiotic produced by *St. tolypophorus*) by extraction a solution of 2 parts by weight of C in 10 parts by volume of methanol and 100 parts by volume of monoacetin are added and the mixture is reacted at 37° C. for 3 hours. After the reaction is complete, the mixture is promptly extracted with ethyl acetate and the extract is purified in the same manner as Example 1. The above procedure gives 0.1 part by weight of C–14-monoacetate.

EXAMPLE 7

In 1000 parts by volume of phosphate buffer, pH 7.0, 0.1 M, is dissolved 1 part by weight of a crude enzyme obtained from a culture of *Streptomyces rochei* var. *volubilis* (ATCC 21250). The solution is combined with 2 parts by weight of C dissolved in 1000 parts by volume of ethyl acetate, and the mixture is stirred at 37° C. for 3 hours. After the reaction is complete, the reaction mixture is separated, in the same manner as Example 1 into two phases and the ethyl acetate phase is purified, to obtain 1.8 part by volume of C–14-monoacetate.

EXAMPLE 8

In 1000 parts by volume of tris buffer (pH 7.0, 0.1 M) is dissolved 10 parts by weight of a crude esterase preparation obtained from a culture of *Aspergillus sojae* (ATCC 20245) and 2 parts by weight of C in 10 parts by volume of methanol is added to the above solution. The mixture is allowed to react at 37° C. for 3 hours, at the end of which time it is extracted with ethyl acetate. The extract is purified by the procedure described in Example 1 to obtain 0.055 part by weight of C–14-monoacetate.

EXAMPLE 9

In 1000 parts by volume of tris buffer (pH 7.0, 0.1 M) is dissolved 10 parts by weight of a crude cellulase preparation obtained from a culture of *Trametes sanguinea* (ATCC 14622) and 2 parts by weight of C in 10 parts by weight of methanol and 130 parts of volume of monoacetin are added to the resulting solution. The mixture is allowed to react at 37° C. for 3 hours, at the end of which time it is extracted with ethyl acetate. The extract is purified by the procedure described in Example 1 to obtain 0.075 part by weight of C–14-monoacetate.

What we claim is:

1. A method for producing a T–2636C–14-monoacyl derivative, which comprises reacting T–2636C with an ester of a fatty acid having an acyl group of the formula,

R·CO— wherein R is hydrogen or lower alkyl of 1–3 carbon atoms in the presence of a culture of a microorganism belonging to the species *Streptomyces rochei* var. *volubilis*, the species *Streptomyces tolypophorus*, the species *Streptomyces hydroscopicus*, the species *Aspergillus sojae* or the species *Trametes sanguinea* or a fraction derived from said culture having a higher capacity of acylating T–2636C at position 14 than the said culture and recovering the resulting T–2636X14-monacyl derivatives.

2. A method according to claim 1, wherein the reaction temperature is from 20° to 40° C.

3. A method according to claim 1, wherein the reaction pH is from 4 to 9.

4. A method according to claim 1, wherein the microorganism is *Streptomyces rochei* var. *volubilis*.

5. A method according to claim 1, wherein the microorganism is *Streptomyces tolypophorus*.

6. A method according to claim 1, wherein the microorganism is *Streptomyces hygroscopicus*.

7. A method according to claim 1, wherein the microorganism is *Aspergillus sojae*.

8. A method according to claim 1, wherein the microorganism is *Trametes sanguinea*.

References Cited

Derwent Belgian Patent Report, No. 47/68, Dec. 30, 1968, p. 2, Abstracting Belgian Pat. No. 715356.

JOSEPH M. GOLIAN, Primary Examiner

U.S. Cl. X.R.

195—20; 424—279; 260—343.5